(12) United States Patent
Sotillo

(10) Patent No.: US 6,805,242 B2
(45) Date of Patent: Oct. 19, 2004

(54) METHOD OF REDUCING PHOSPHATE ORE LOSSES IN A DESLIMING PROCESS

(75) Inventor: Francisco J. Sotillo, Lakeland, FL (US)

(73) Assignee: ARR-MAZ Products, L.P., Winter Haven, FL (US)

(*) Notice: Subject to any disclaimer, the term of this patent is extended or adjusted under 35 U.S.C. 154(b) by 209 days.

(21) Appl. No.: 10/026,223

(22) Filed: Dec. 19, 2001

(65) Prior Publication Data

US 2003/0121833 A1 Jul. 3, 2003

(51) Int. Cl.$^7$ ................................................ B03B 1/00
(52) U.S. Cl. .................. 209/4; 209/5; 209/9; 209/12.1; 209/164; 209/172.5; 209/173
(58) Field of Search ........................... 209/4, 5, 9, 12.1, 209/164, 172.5, 173

(56) References Cited

U.S. PATENT DOCUMENTS

| | | | |
|---|---|---|---|
| 1,446,378 A | | 3/1923 | Borcherdt |
| 1,448,515 A | | 3/1923 | Borcherdt |
| 1,454,838 A | | 5/1923 | Borcherdt |
| 1,799,277 A | | 4/1931 | Borcherdt |
| 2,066,778 A | | 1/1937 | Herbsman |
| 2,381,514 A | | 8/1945 | Phelps |
| 2,868,618 A | | 1/1959 | Oberg et al. |
| 2,990,958 A | | 7/1961 | Greene et al. |
| 3,259,326 A | | 7/1966 | Duke et al. |
| 3,302,785 A | | 2/1967 | Greene |
| 3,670,883 A | | 6/1972 | Weir |
| 4,069,144 A | * | 1/1978 | Johnson et al. ................ 209/11 |
| 4,105,749 A | * | 8/1978 | Wilson et al. ............... 423/320 |
| 4,177,243 A | * | 12/1979 | Schwartz et al. ........ 423/157.4 |
| 4,194,969 A | | 3/1980 | Chung et al. |
| 4,203,837 A | * | 5/1980 | Hoge et al. .................. 210/705 |
| 4,279,635 A | | 7/1981 | Krofchak |
| 4,309,282 A | * | 1/1982 | Smith et al. ................ 209/166 |
| 4,374,817 A | | 2/1983 | Lehman et al. |
| 4,377,472 A | * | 3/1983 | Allen ........................ 209/166 |
| 4,563,285 A | | 1/1986 | Nair et al. |
| 4,585,629 A | * | 4/1986 | Kremer et al. ........... 423/157.3 |
| 4,615,869 A | | 10/1986 | Kremer et al. |
| 4,690,752 A | | 9/1987 | Shaw |
| 4,720,339 A | * | 1/1988 | Nagaraj et al. ............. 209/167 |
| 5,183,211 A | | 2/1993 | Malito |
| 5,540,337 A | * | 7/1996 | Riggs et al. ................ 209/166 |
| 5,688,404 A | | 11/1997 | Luke et al. |
| 5,858,214 A | * | 1/1999 | Yap .............................. 209/166 |
| 5,865,318 A | * | 2/1999 | Yu et al. ..................... 209/166 |
| 5,938,833 A | | 8/1999 | Willis et al. |
| 5,962,828 A | * | 10/1999 | Hughes ...................... 209/166 |
| 6,149,013 A | * | 11/2000 | Hughes ...................... 209/166 |

* cited by examiner

Primary Examiner—Donald P. Walsh
Assistant Examiner—Matthew J. Kohner
(74) Attorney, Agent, or Firm—Dennis G. LaPointe; Mason Law, P.L.

(57) ABSTRACT

The specification describes one or more embodiments of the present invention, which relates to a method of reducing phosphate ore losses in a desliming process. A phosphate ore preparation slurry is directed to a desliming unit; surfactants and/or an organic polymers are added to the slurry and mixed into the slurry to reduce the viscosity of the slurry and to settle out the fine phosphate ore particles for recovery. These particles are collected and directed to a beneficiation process for recovering the phosphate ore product. It is emphasized that this abstract is provided to comply with the rules requiring an abstract that will allow a reader to quickly ascertain the subject matter of the technical disclosure. It is submitted with the understanding that it will not be used to interpret or limit the scope of meaning of the claims. 37 CFR 1.72(b).

36 Claims, 4 Drawing Sheets

PRIOR ART

METHOD OF REDUCING PHOSPHATE ORE LOSSES IN A DESLIMING PROCESS

The invention relates to the use of dispersants to reduce phosphate ore losses during desliming of a phosphate ore feed slurry containing thick slimes.

Figure 1:
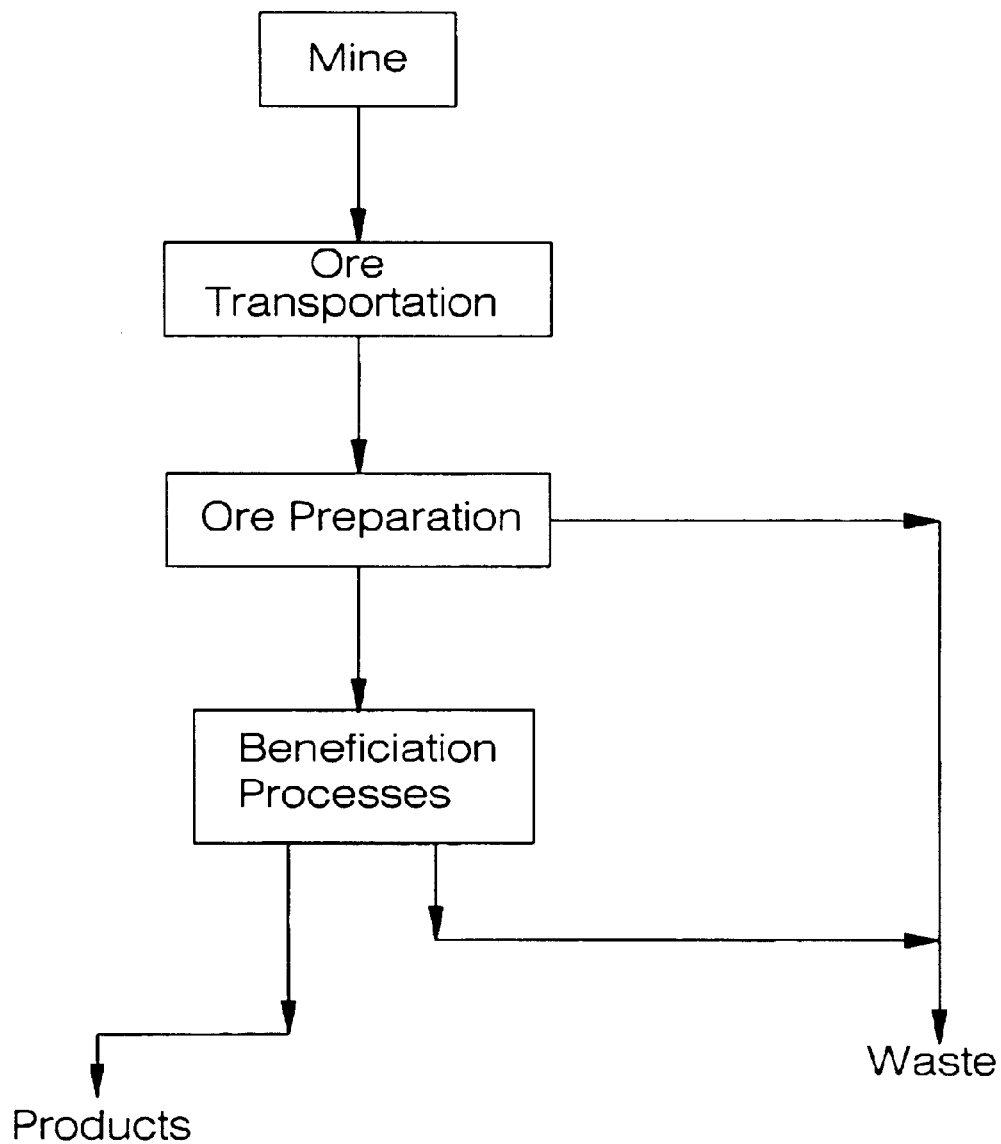
FIG. 1 is a general schematic overview flowchart depicting a typical phosphate ore processing step.
Figure 2:
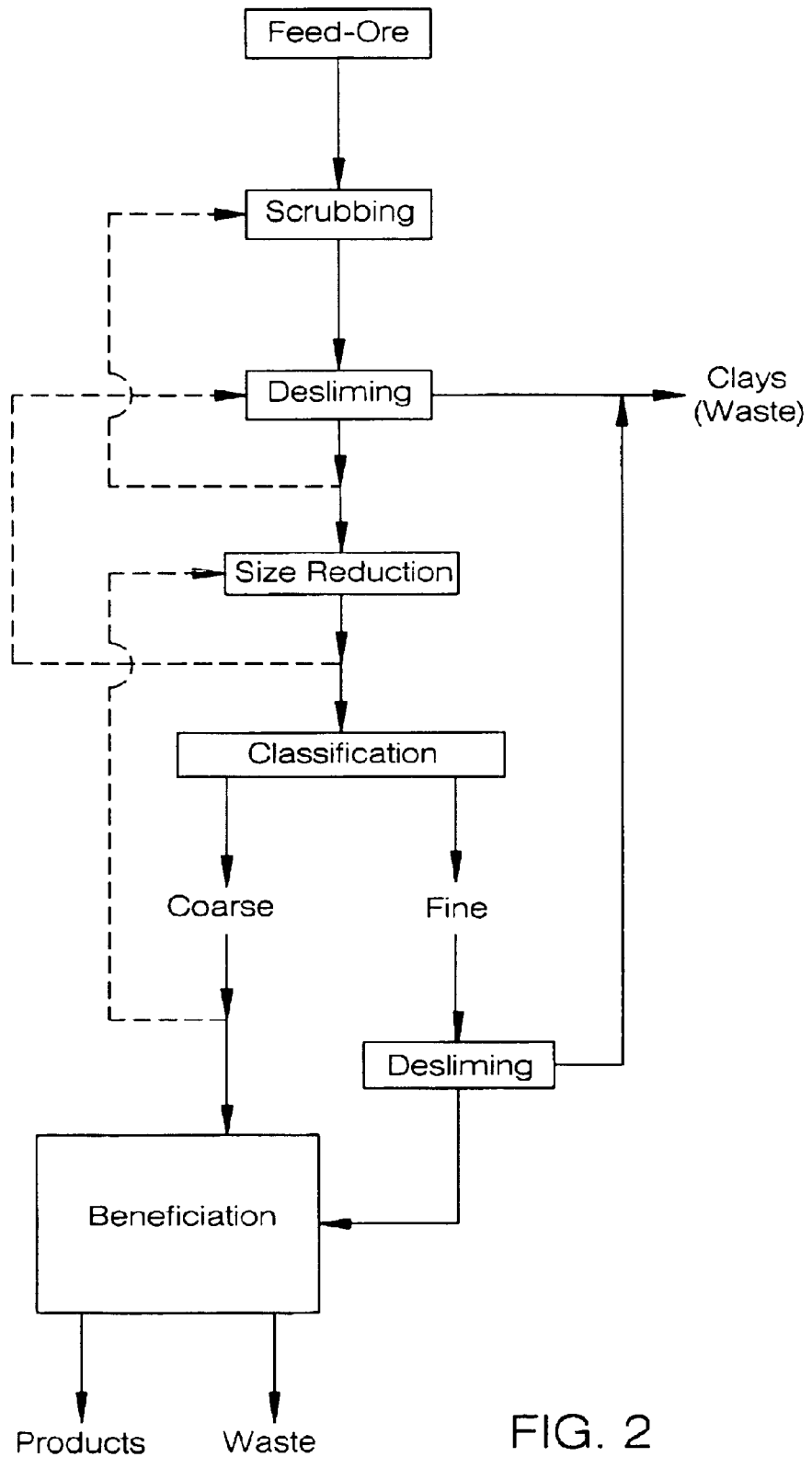
FIG. 2 is an overview flowchart showing typical phosphate ore feed preparation steps.

Referring now to the drawings, FIG. 1 shows a flowchart of a typical phosphate ore processing step. The method of the present invention is performed during the phosphate ore desliming step, as shown in FIG. 2.

It has been discovered that the addition of surfactants and/or organic polymers to the phosphate ore feed slurry during desliming reduces the amount of fine phosphate ore particles lost to the waste clay streams, hence improving the recovery of fine phosphate particles.

Surfactants useful in the present invention are water soluble/dispersable surface active agents, the preferred being anionic. Surfactants suitable for use in enhancing the settling of fine phosphate ore particles from thick slime slurries preferably include those selected from, but not limited to, the group consisting of ammonium salts, lithium salts, sodium salts, and potassium salts of $C_6$–$C_{16}$ alkyl-X, alkylene-X, aryl-X, alkyl aryl-X, naphthalene-X, and combinations thereof, wherein X is one of mono-sulfonic acids, poly-sulfonic acids, mono-sulfuric acids, poly-sulfuric acids, mono-phosphoric acids, poly-phosphoric acids, mono-phosphonic acids, poly-phosphonic acids, mono-carboxylic acids, poly-carboxylic acids, and combinations thereof. Another equivalent or more simple way of expressing the above one or more surfactants is that the one or more surfactants are anionics selected from the group consisting of salts of mono and divalent ions of general formula R—X(m) wherein R is $C_6$–$C_{16}$ alkyl, alkylene, aryl, alkyl aryl, naphthalene, or substituted naphthalene, and X is sulfonic acid, sulfuric acid, phosphoric acid, or carboxylic acid, and m is 1 to 5.

Another equivalent or more simple way of expressing the above one or more surfactants is that the one or more surfactants are anionics selected from the group consisting of salts of mono and divalent ions of general formula R—X(m) wherein R is $C_6$–$C_{16}$ alkyl, alkylene, aryl, alkyl aryl, naphthalene, or substituted naphthalene, and X is sulfonic acid, sulfuric acid, phosphoric acid, or carboxylic acid, and m is 1 to 5.

Organic polymers useful in the present invention are preferably those selected from, but not limited to, the group consisting of synthetic polymers, semisynthetic polymers, natural polymers and combinations thereof.

The polymers may be selected from the group consisting of formaldehyde products, cellulose products, gelatin products, starch products, acrylamides, acrylates, and their related products.

The present invention therefore provides for a method of reducing phosphate ore losses in a desliming process. A phosphate ore preparation slurry is directed through various transport means to a desliming unit. There are many types of desliming units such as large tanks, settling tanks, sand traps, hydrocyclones, classifiers, thickeners, ground containment areas, among others.

Figure 3:
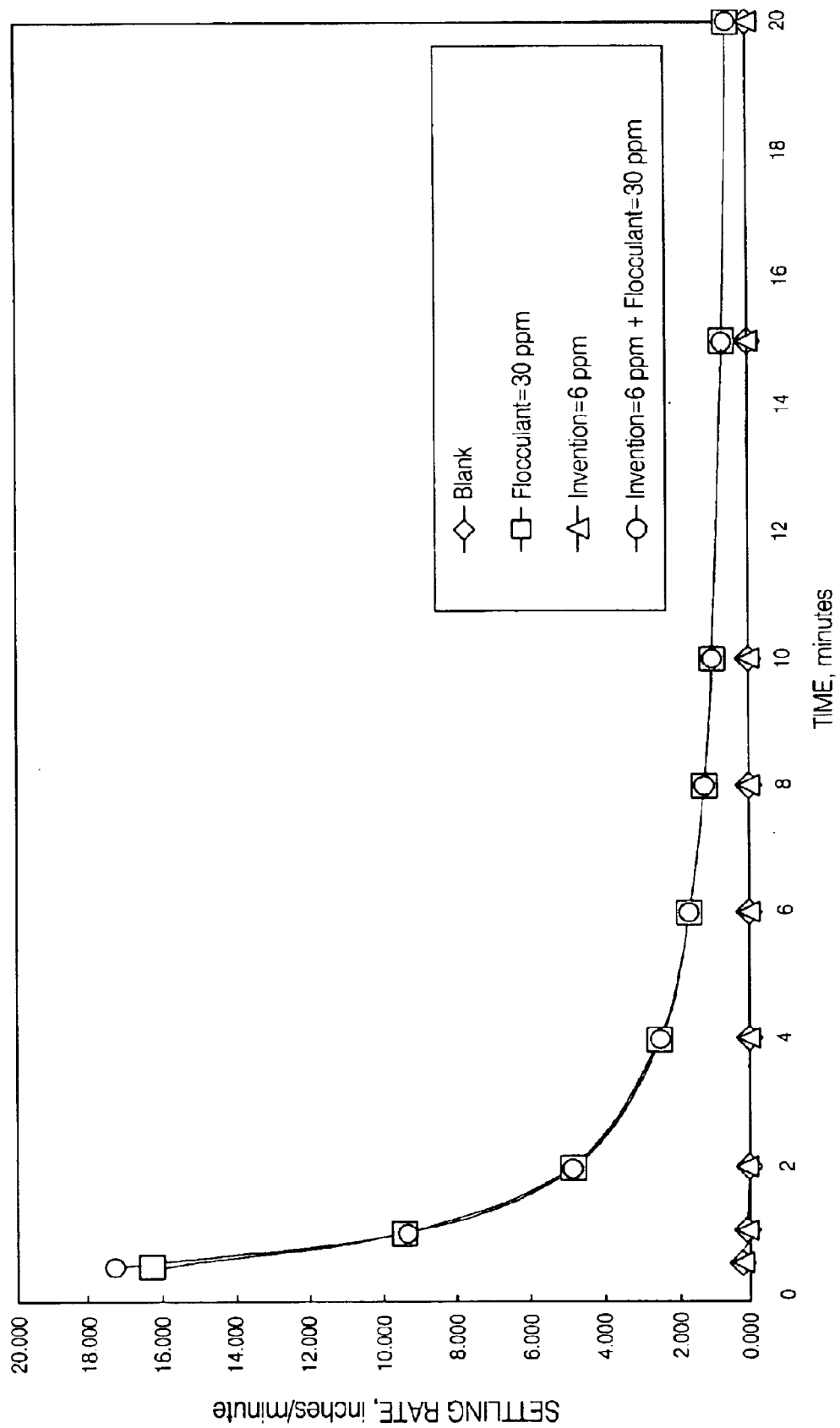
FIG. 3 is a graphic illustration showing no adverse affect of the reagent used in the present invention on the clay settling.
Figure 4:
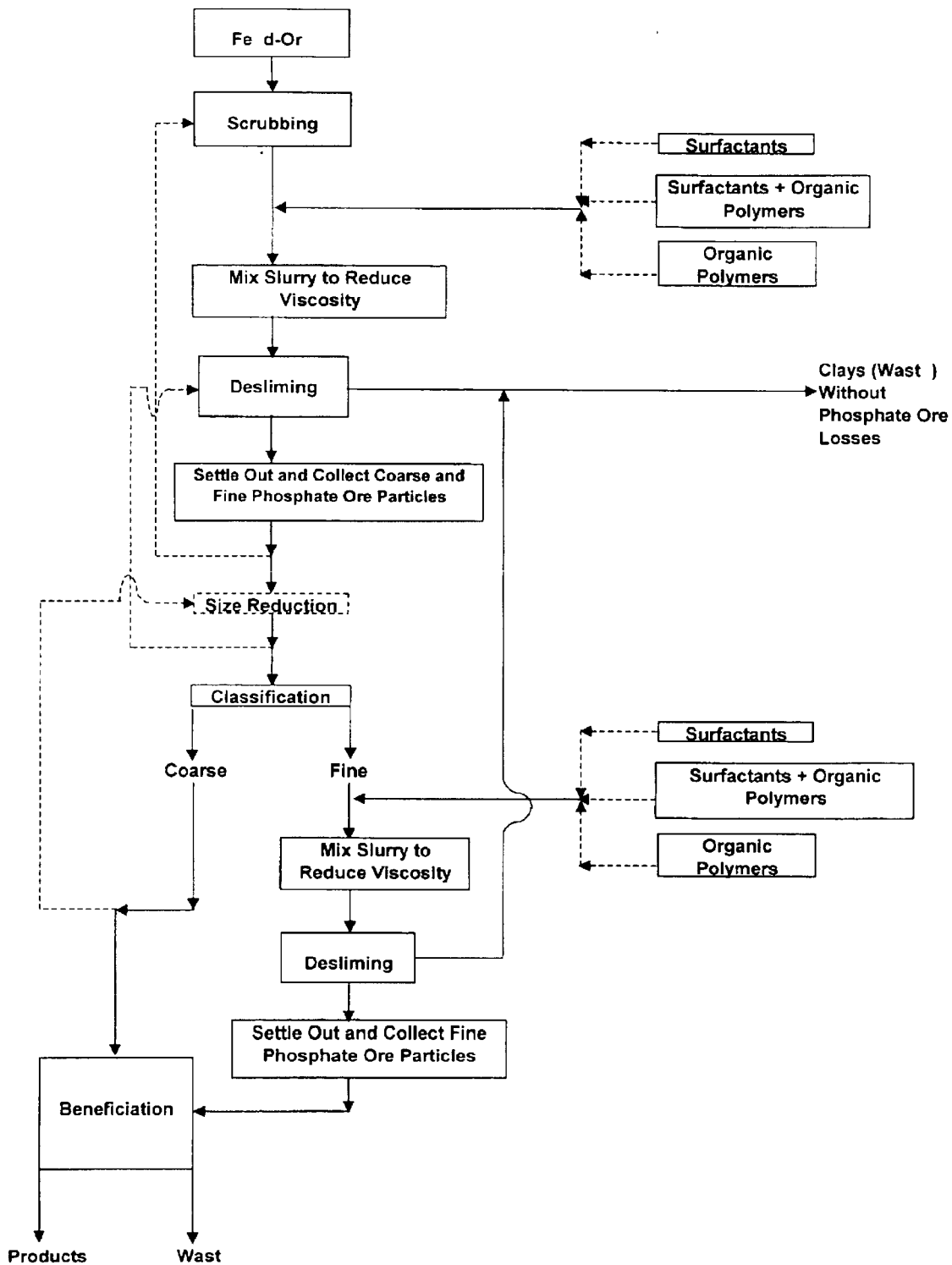
FIG. 4 is a conceptual flow chart of the inventive process during desliming of a phosphate ore feed slurry.

As generally shown in the flow chart of FIG. 4, to the slurry is added either a sufficient amount of a surfactant/surfactants, a sufficient amount of an organic polymer/polymers and/or a sufficient amount of a combination of surfactants and organic polymers. The surfactants and/or polymers are mixed with the slurry so as to reduce the viscosity of the slurry. The fine phosphate ore particles thereby settle along with the coarser fraction and are then collected and routed or directed through a beneficiation process for recovering the phosphate ore product. Phosphate ore losses to the waste clay stream are reduced using the present invention method without adversely effecting the settling rate of slimes in clay ponds as shown in the examples illustrated in FIG. 3. FIG. 3 shows the settling rates of the clay slurry at various settling times under conditions where no reagent is added, 6 ppm of reagent is added, 30 ppm of clay flocculent which is typically used to enhance the settling of clay is added, and 6 ppm of reagent is added together with 30 ppm of clay flocculent. The settling rates of the clay in the presence of 6 ppm of reagent are the same without any addition of reagent; and the settling rates of the clay in the presence of 30 ppm of clay flocculent are not effected by the addition of the 6 ppm of reagent used in the present invention. The four curves depicted in FIG. 3 are reflective of the results of each condition tested.

EXAMPLES

The following examples serve to provide further appreciation of the invention but are not meant in any way to restrict the effective scope of the invention.

Example I

The invention was tested with a Central Florida phosphate ore. Phosphate matrix was pumped from the mine at about 40–51% solids content to the ore preparation facility. This ore preparation facility consists of a receiving tank, distributors, trommels, a settling-desliming tank, and a sand trap. The matrix was then pumped from the receiving tank to a distributor that feeds two trommels. The oversize fraction of these trommels is rejected as mud balls, whereas the undersize is discharged into the settling-desliming tank. The underflow of the settling-desliming tank is pumped to the beneficiation plant, and the overflow containing heavy clays and fine phosphate particles is fed to the sand trap. The fine phosphate particles that are settled in the sand trap return to the settling-desliming tank, whereas the overflow of the sand trap is pumped to the clay ponds as a waste stream. The phosphate ore content of the overflow of the sand trap constitutes the phosphate feed losses. In the absence of this invention, ore feed losses are heavy due to the high viscosity of the clayish slurry in both the settling-desliming tank and the sand trap.

The tests were carried out on a day on/day off fashion to compare the effect of this invention on the reduction of feed losses. The invention was added or performed to the settling-desliming tank and to the feed to the sand trap without any pH adjustment. Table 1 presents a comparison of the feed losses reduction obtained in the presence of 0.075–0.185 lb/ton of matrix, the average addition being 0.136 lb/ton.

TABLE 1

Effect of the Inventive Method on the Reduction of Feed Losses

| Test | TPH Losses | +150 M TPH Losses | % Losses |
|---|---|---|---|
| No dispersant added | 1050 | 715 | 100 |
| Dispersant added | 804 | 459 | 64 |
| Reduction in Losses | 246 | 256 | 36 |

The reduction in feed losses that can be recovered in the downstream unit operations is 256 TPH, corresponding to a 36% reduction of the phosphate feed losses. The phosphate recovery obtained in the absence and presence of the use of the inventive method was 80%.

Example II

In this example, the inventive method was tested in the same industrial facility. The inventive method was applied to the receiving tank and to the settling-desliming tank where the dispersants were added at a rate of 0.073–0.110 lb/ton of matrix. As in the case of previous example, no pH adjustment was required for the matrix. Table 2 presents a comparison of the phosphate feed losses reduction in TPH, BPL, BPL-Tons and percentages.

TABLE 2

Effect of the Inventive Method on the Reduction of Feed Losses

| Test | Losses | | | | | |
|---|---|---|---|---|---|---|
| | TPH | +150M TPH | % | BPL % | BPL-Tons | % |
| No dispersant added | 723 | 422 | 100 | 6.75 | 28.5 | 100 |
| Dispersant added | 540 | 292 | 69 | 4.71 | 13.8 | 48 |
| Reduction in Losses | 183 | 130 | 31 | 2.04 | 14.7 | 52 |

This test shows a reduction in feed losses of 130 TPH or 31% of the tonnage lost. The BPL content of the sand trap overflow (feed losses in the waste stream) is reduced from 6.75% to 4.71%. This corresponds to a recovery of 14.7 BPL-Ton or a reduction of 52% of the phosphate losses. During this test, there was no noticeable difference in the result of the phosphate flotation, which confirms that there is no adverse effect to implementing this inventive process on a phosphate flotation circuit.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

Now that the invention has been described,
What is claimed is:

1. A method of reducing phosphate ore losses in a desliming process comprising:
    directing a phosphate ore feed preparation slurry to a desliming unit;
    adding a sufficient amount of:
        one or more surfactants, wherein the one or more surfactants are anionics selected from the group consisting of salts of mono and divalent ions of general formula R—X(m) wherein R is $C_6$–$C_{16}$ alkyl, alkylene, aryl, alkyl aryl, naphthalene, or substituted naphthalene, and X is sulfonic acid, sulfuric acid, phosphoric acid, or carboxylic acid, and m is 1 to 5, or
        one or more organic polymers selected from the group consisting of synthetic polymers, semisynthetic polymers, natural polymers and any combination of said polymers, or
        a combination of said one or more surfactants and said one or more organic polymers, to the phosphate ore feed preparation slurry;
    mixing said
        one or more surfactants,
        one or more organic polymers, or
        said combination of said one or more surfactants and one or more organic polymers,
        so as to reduce a viscosity of the phosphate ore feed preparation slurry and wherein fine phosphate ore particles are made to settle for recovery;
    collecting said fine phosphate ore particles which have settled out from the phosphate ore feed preparation slurry for directing to a beneficiation process for recovering a phosphate ore product; and
    directing said collected fine phosphate ore particles along with coarser fractions to the beneficiation process for recovering the phosphate ore product.

2. The method according to claim 1, wherein when the combination of the one or more surfactants and one or more organic polymers is added to the phosphate ore feed preparation slurry, the one or more surfactants are added prior to the addition of the one or more organic polymers.

3. The method according to claim 1, wherein when the combination of the one or more surfactants and one or more organic polymers is added to the phosphate ore feed preparation slurry, the one or more organic polymers are added prior to the addition of the one or more surfactant.

4. The method according to claim 1, wherein when the combination of the one or more surfactants and one or more organic polymers is added to the phosphate ore preparation slurry, the one or more surfactants and the one or more organic polymers are added to the phosphate ore preparation slurry simultaneously.

5. The method according to claim 1, wherein the polymers are selected from the group consisting of formaldehyde products, cellulose products, gelatin products, starch products, acrylamides, and acrylates.

6. The method according to claim 1, wherein the desliming unit comprises one of large tanks, settling tanks, sand traps, hydrocyclones, classifiers, thickeners, and ground containment areas.

7. A method of reducing phosphate ore losses in a desliming process comprising:
    adding a sufficient amount of
        one or more surfactants, wherein the one or more surfactants are anionics selected from the group consisting of salts of mono and divalent ions of general formula R—X(m) wherein R is $C_6$–$C_{16}$ alkyl, alkylene, aryl, alkyl aryl, naphthalene, or substituted naphthalene, and X is sulfonic acid, sulfuric acid, phosphoric acid, or carboxylic acid, and m is 1 to 5, or
        one or more organic polymers selected from the group consisting of synthetic polymers, semisynthetic polymers, natural polymers and any combination of said polymers, or
        a combination of said surfactants and organic polymers to a phosphate ore feed preparation slurry in a desliming unit;

mixing said
  one or more surfactants,
  one or more organic polymers, or
  said combination of said one or more surfactants and one or more organic polymers,
    so as to reduce the viscosity of the phosphate ore preparation slurry and
wherein fine phosphate ore particles are made to settle and are collected for recovery.

8. The method according to claim 7, wherein when the combination of the one or more surfactants and one or more organic polymers is added to the phosphate ore preparation slurry, the surfactant is added prior to the addition of the one or more organic polymers.

9. The method according to claim 7, wherein when the combination of the one or more surfactants and one or more organic polymers is added to the phosphate ore feed preparation slurry, the one or more organic polymers are added prior to the addition of the one or more surfactants.

10. The method according to claim 7, wherein when the combination of the one or more surfactants and the one or more organic polymers is added to the phosphate ore feed preparation slurry, the one or more surfactants and the one or more organic polymers are added to the phosphate ore feed preparation slurry simultaneously.

11. The method according to claim 7, wherein the polymers are selected from the group consisting of formaldehyde products, cellulose products, gelatin products, starch products, acrylamides, and acrylates.

12. The method according to claim 7, wherein the desliming unit comprises one of large tanks, settling tanks, sand traps, hydrocyclones, classifiers, thickeners, and ground containment areas.

13. A method of reducing phosphate ore losses in a desliming process comprising:
  directing a phosphate ore feed preparation slurry to a desliming unit;
  adding a sufficient amount of:
    one or more surfactants, or
    one or more organic polymers, or
    a combination of said one or more surfactants and said one or more organic polymers,
    to the phosphate ore feed preparation slurry;
  mixing said:
    one or more surfactants, or
    one or more organic polymers, or
    said combination of said one or more surfactants and one or more organic polymers,
    so as to reduce a viscosity of the phosphate ore feed preparation slurry and
  wherein fine phosphate ore particles are made to settle for recovery;
  collecting said fine phosphate ore particles which have settled out from the phosphate ore feed preparation slurry for directing to a beneficiation process for recovering a phosphate ore product; and
  directing said collected fine phosphate ore particles along with coarser fractions to the beneficiation process for recovering the phosphate ore product,
  wherein when the combination of the one or more surfactants and one or more organic polymers is added to the phosphate ore feed preparation slurry, the one or more surfactants are added prior to the addition of the one or more organic polymers.

14. The method according to claim 13,
  wherein the one or more surfactants are anionics selected from the group consisting of salts of mono and divalent ions of general formula R—X(m) wherein R is $C_6$–$C_{16}$ alkyl, alkylene, aryl, alkyl aryl, naphthalene, or substituted naphthalene, and X is sulfonic acid, sulfuric acid, phosphoric acid, or carboxylic acid, and m is 1 to 5, and
  wherein the one or more organic polymers are selected from the group consisting of synthetic polymers, semi-synthetic polymers, natural polymers and any combination of said polymers.

15. The method according to claim 14, wherein the polymers are selected from the group consisting of formaldehyde products, cellulose products, gelatin products, starch products, acrylamides, and acrylates.

16. The method according to claim 13, wherein the desliming unit comprises one of large tanks, settling tanks, sand traps, hydrocyclones, classifiers, thickeners, and ground containment areas.

17. A method of reducing phosphate ore losses in a desliming process comprising:
  directing a phosphate ore feed preparation slurry to a desliming unit;
  adding a sufficient amount of:
    one or more surfactants, or
    one or more organic polymers, or
    a combination of said one or more surfactants and said one or more organic polymers,
    to the phosphate ore feed preparation slurry;
  mixing said:
    one or more surfactants, or
    one or more organic polymers, or
    said combination of said one or more surfactants and one or more organic polymers,
    so as to reduce a viscosity of the phosphate ore feed preparation slurry and
  wherein fine phosphate ore particles are made to settle for recovery;
  collecting said fine phosphate ore particles which have settled out from the phosphate ore feed preparation slurry; and
  directing said collected fine phosphate ore particles along with coarser fractions to a beneficiation process for recovering a phosphate ore product,
  wherein when the combination of the one or more surfactants and one or more organic polymers is added to the phosphate ore feed preparation slurry, the one or more organic polymers are added prior to the addition of the one or more surfactant.

18. The method according to claim 17,
  wherein the one or more surfactants are anionics selected from the group consisting of salts of mono and divalent ions of general formula R—X(m) wherein R is $C_6$–$C_{16}$ alkyl, alkylene, aryl, alkyl aryl, naphthalene, or substituted naphthalene, and X is sulfonic acid, sulfuric acid, phosphoric acid, or carboxylic acid, and m is 1 to 5, and
  wherein the one or more organic polymers are selected from the group consisting of synthetic polymers, semi-synthetic polymers, natural polymers and any combination of said polymers.

19. The method according to claim 18, wherein the polymers are selected from the group consisting of formaldehyde products, cellulose products, gelatin products, starch products, acrylamides, and acrylates.

20. The method according to claim 17, wherein the desliming unit comprises one of large tanks, settling tanks, sand traps, hydrocyclones, classifiers, thickeners, and ground containment areas.

21. A method of reducing phosphate ore losses in a desliming process comprising:
   directing a phosphate ore feed preparation slurry to a desliming unit;
   adding a sufficient amount of:
      one or more surfactants, or
      one or more organic polymers, or
      a combination of said one or more surfactants and said one or more organic polymers,
      to the phosphate ore feed preparation slurry;
   mixing said:
      one or more surfactants, or
      one or more organic polymers, or
      said combination of said one or more surfactants and one or more organic polymers,
      so as to reduce a viscosity of the phosphate ore feed preparation slurry and
   wherein fine phosphate ore particles are made to settle for recovery;
   collecting said fine phosphate ore particles which have settled out from the phosphate ore feed preparation slurry; and
   directing said collected fine phosphate ore particles along with coarser fractions to a beneficiation process for recovering a phosphate ore product,
   wherein when the combination of the one or more surfactants and one or more organic polymers is added to the phosphate ore preparation slurry, the one or more surfactants and the one or more organic polymers are added to the phosphate ore preparation slurry simultaneously.

22. The method according to claim 21, wherein the one or more surfactants are anionics selected from the group consisting of salts of mono and divalent ions of general formula R—X(m) wherein R is $C_6$–$C_{16}$ alkyl, alkylene, aryl, alkyl aryl, naphthalene, or substituted naphthalene, and X is sulfonic acid, sulfuric acid, phosphoric acid, or carboxylic acid, and m is 1 to 5, and wherein the one or more organic polymers are selected from the group consisting of synthetic polymers, semi-synthetic polymers, natural polymers and any combination of said polymers.

23. The method according to claim 22, wherein the polymers are selected from the group consisting of formaldehyde products, cellulose products, gelatin products, starch products, acrylamides, and acrylates.

24. The method according to claim 21, wherein the desliming unit comprises one of large tanks, settling tanks, sand traps, hydrocyclones, classifiers, thickeners, and ground containment areas.

25. A method of reducing phosphate ore losses in a desliming process comprising:
   adding one of:
      a sufficient amount of one or more surfactants, or
      a sufficient amount of one or more organic polymers, or
      a sufficient amount of a combination of said surfactants and organic polymers to a phosphate ore feed preparation slurry in a desliming unit;
   mixing said one of the one or more surfactants, the one or more organic polymers or the combination of said one or more surfactants and one or more organic polymers, so as to reduce the viscosity of the phosphate ore preparation slurry and wherein fine phosphate ore particles are made to settle and are collected for recovery,
   wherein when the combination of the one or more surfactants and one or more organic polymers is added to the phosphate ore preparation slurry, the surfactant is added prior to the addition of the one or more organic polymers.

26. The method according to claim 25, wherein the one or more surfactants are anionics selected from the group consisting of salts of mono and divalent ions of general formula R—X(m) wherein R is $C_6$–$C_{16}$ alkyl, alkylene, aryl, alkyl aryl, naphthalene, or substituted naphthalene, and X is sulfonic acid, sulfuric acid, phosphoric acid, or carboxylic acid, and m is 1 to 5, and wherein the one or more organic polymers are selected from the group consisting of synthetic polymers, semi-synthetic polymers, natural polymers and any combination of said polymers.

27. The method according to claim 26, wherein the polymers are selected from the group consisting of formaldehyde products, cellulose products, gelatin products, starch products, acrylamides, and acrylates.

28. The method according to claim 25, wherein the desliming unit comprises one of large tanks, settling tanks, sand traps, hydrocyclones, classifiers, thickeners, and ground containment areas.

29. A method of reducing phosphate ore losses in a desliming process comprising:
   adding one of:
      a sufficient amount of one or more surfactants, or
      a sufficient amount of one or more organic polymers, or
      a sufficient amount of a combination of said surfactants and organic polymers to a phosphate ore feed preparation slurry in a desliming unit;
   mixing said one of the one or more surfactants, the one or more organic polymers or the combination of said one or more surfactants and one or more organic polymers, so as to reduce the viscosity of the phosphate ore preparation slurry and wherein fine phosphate ore particles are made to settle and are collected for recovery,
   wherein when the combination of the one or more surfactants and one or more organic polymers is added to the phosphate ore feed preparation slurry, the one or more organic polymers are added prior to the addition of the one or more surfactants.

30. The method according to claim 29, wherein the one or more surfactants are anionics selected from the group consisting of salts of mono and divalent ions of general formula R—X(m) wherein R is $C_6$–$C_{16}$ alkyl, alkylene, aryl, alkyl aryl, naphthalene, or substituted naphthalene, and X is sulfonic acid, sulfuric acid, phosphoric acid, or carboxylic acid, and m is 1 to 5, and wherein the one or more organic polymers are selected from the group consisting of synthetic polymers, semi-synthetic polymers, natural polymers and any combination of said polymers.

31. The method according to claim 30, wherein the polymers are selected from the group consisting of formaldehyde products, cellulose products, gelatin products, starch products, acrylamides, and acrylates.

32. The method according to claim 29, wherein the desliming unit comprises one of large tanks, settling tanks, sand traps, hydrocyclones, classifiers, thickeners, and ground containment areas.

33. A method of reducing phosphate ore losses in a desliming process comprising:
   adding one of:
      a sufficient amount of one or more surfactants, or
      a sufficient amount of one or more organic polymers, or
      a sufficient amount of a combination of said surfactants and organic polymers to a phosphate ore feed preparation slurry in a desliming unit;

mixing said one of the one or more surfactants, the one or more organic polymers or the combination of said one or more surfactants and one or more organic polymers, so as to reduce the viscosity of the phosphate ore preparation slurry and wherein fine phosphate ore particles are made to settle and are collected for recovery, wherein when the combination of the one or more surfactants and the one or more organic polymers is added to the phosphate ore feed preparation slurry, the one or more surfactants and the one or more organic polymers are added to the phosphate are feed preparation slurry simultaneously.

34. The method according to claim 33, wherein the one or more surfactants are anionics selected from the group consisting of salts of mono and divalent ions of general formula R—X(m) wherein R is $C_6$–$C_{16}$ alkyl, alkylene, aryl, alkyl aryl, naphthalene, or substituted naphthalene, and X is sulfonic acid, sulfuric acid, phosphoric acid, or carboxylic acid, and m is 1 to 5, and wherein the one or more organic polymers are selected from the group consisting of synthetic polymers, semi-synthetic polymers, natural polymers and any combination of said polymers.

35. The method according to claim 34, wherein the polymers are selected from the group consisting of formaldehyde products, cellulose products, gelatin products, starch products, acrylamides, and acrylates.

36. The method according to claim 33, wherein the desliming unit comprises one of large tanks, settling tanks, sand traps, hydrocyclones, classifiers, thickeners, and ground containment areas.

* * * * *